United States Patent [19]
Zollinger

[11] Patent Number: 5,389,760
[45] Date of Patent: Feb. 14, 1995

[54] FLASH BUTT WELDING FACILITY

[75] Inventor: Hansrudolf Zollinger, Geroldswil, Switzerland

[73] Assignee: H. A. Schlatter AG., Schlieren, Switzerland

[21] Appl. No.: 130,548

[22] Filed: Oct. 1, 1993

[30] Foreign Application Priority Data

Nov. 9, 1992 [CH] Switzerland ............... 3458/92

[51] Int. Cl.$^6$ ............................................. B23K 11/04
[52] U.S. Cl. ........................................ 219/53; 219/97
[58] Field of Search .................. 219/53, 97, 100, 101

[56] References Cited

U.S. PATENT DOCUMENTS

| | | |
|---|---|---|
| 3,036,204 | 5/1962 | Stieglitz et al. ............. 219/101 |
| 3,982,091 | 9/1976 | Zollinger ..................... 219/101 |
| 4,103,139 | 7/1978 | Zollinger ..................... 219/101 |
| 4,410,780 | 10/1983 | Mutti ............................ 219/53 |
| 4,414,454 | 11/1983 | Zollinger ....................... 219/53 |
| 4,983,801 | 1/1991 | Theurer et al. ................. 219/97 |
| 5,099,097 | 3/1992 | Theurer .......................... 219/53 |
| 5,136,140 | 8/1992 | Theurer et al. ................. 219/53 |

FOREIGN PATENT DOCUMENTS

| | | |
|---|---|---|
| 0326793 | 8/1989 | European Pat. Off. . |
| 0499019 | 8/1992 | European Pat. Off. . |
| 8717265 | 7/1988 | Germany . |

*Primary Examiner*—Clifford C. Shaw
*Attorney, Agent, or Firm*—Brady, O'Boyle & Gates

[57] ABSTRACT

A flash butt welding facility exhibits a housing (1) and a slide (2) linearly displaceable in the former. Respectively one clamping system is installed in the housing (1) and in the slide (2), by means of which profiled workpieces, e.g. rails (5a, 5b), can be retained and positioned. A device for displacing the clamping systems, especially for compressing profiled workpieces (e.g. rails), comprises at least one press cylinder (11) arranged above the workpiece clamping axis (17) and acting in the longitudinal direction and at least one lever (8) rotatably connected to the slide (2) in the force application point (9). The press cylinder (11) is connected to one end of the lever (8). The center of the lever (8) is articulated (7a) to the housing by way of a pull rod (6a). The pressing force produced above the rail clamping axis (17) is made to be effective in the clamping axis in this way.

16 Claims, 9 Drawing Sheets

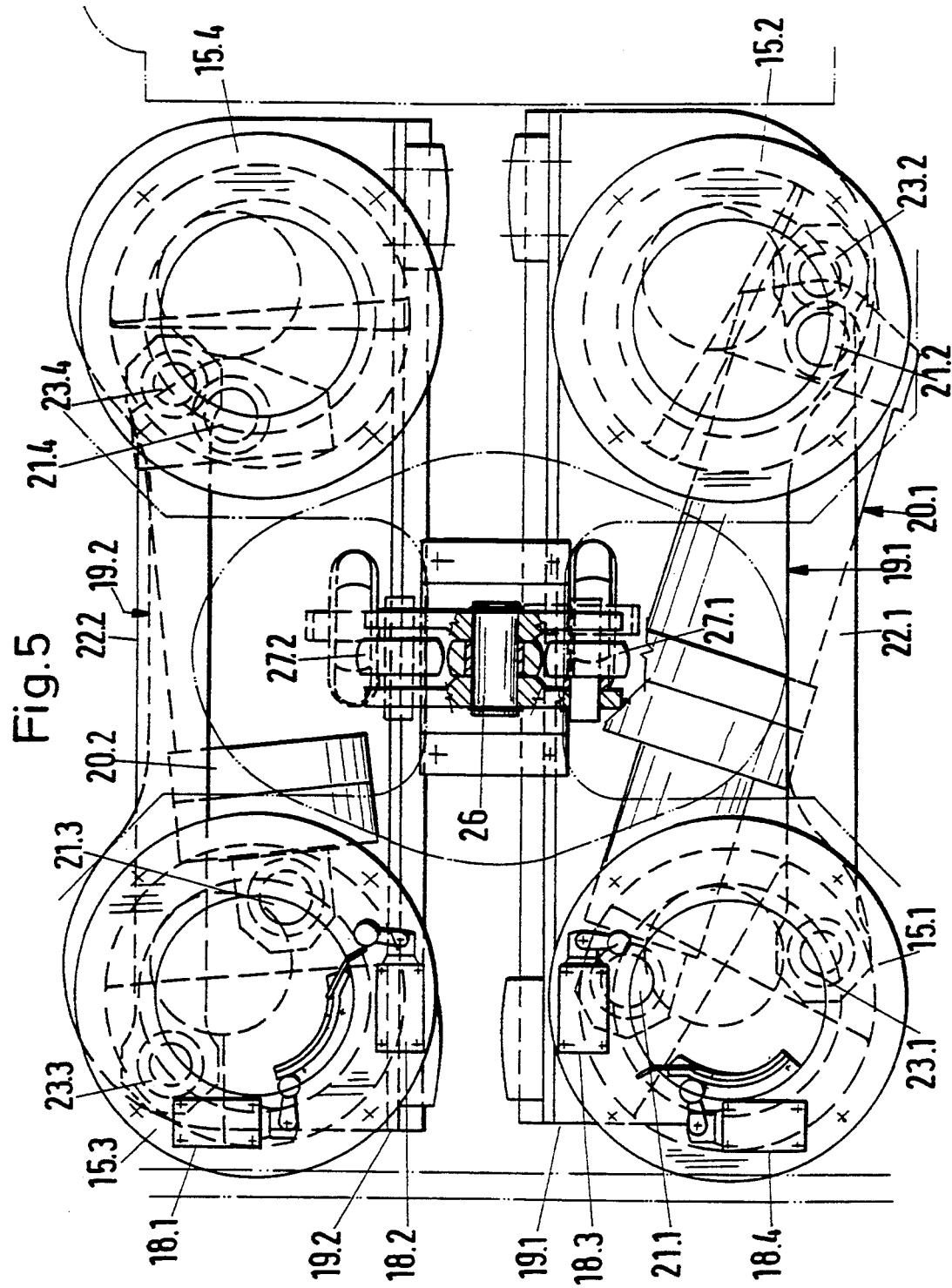

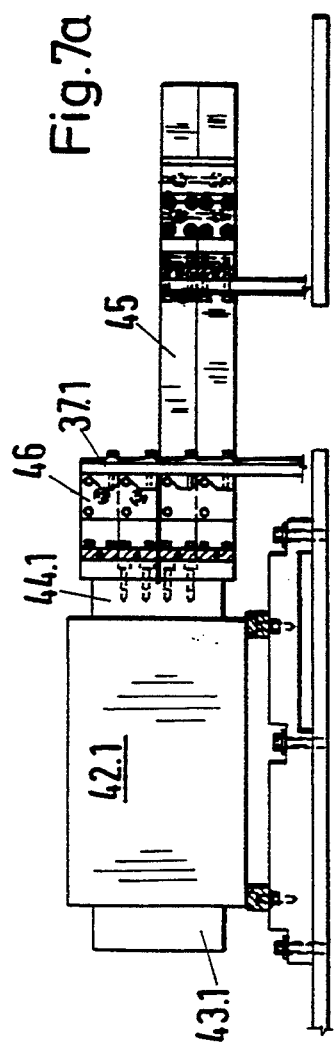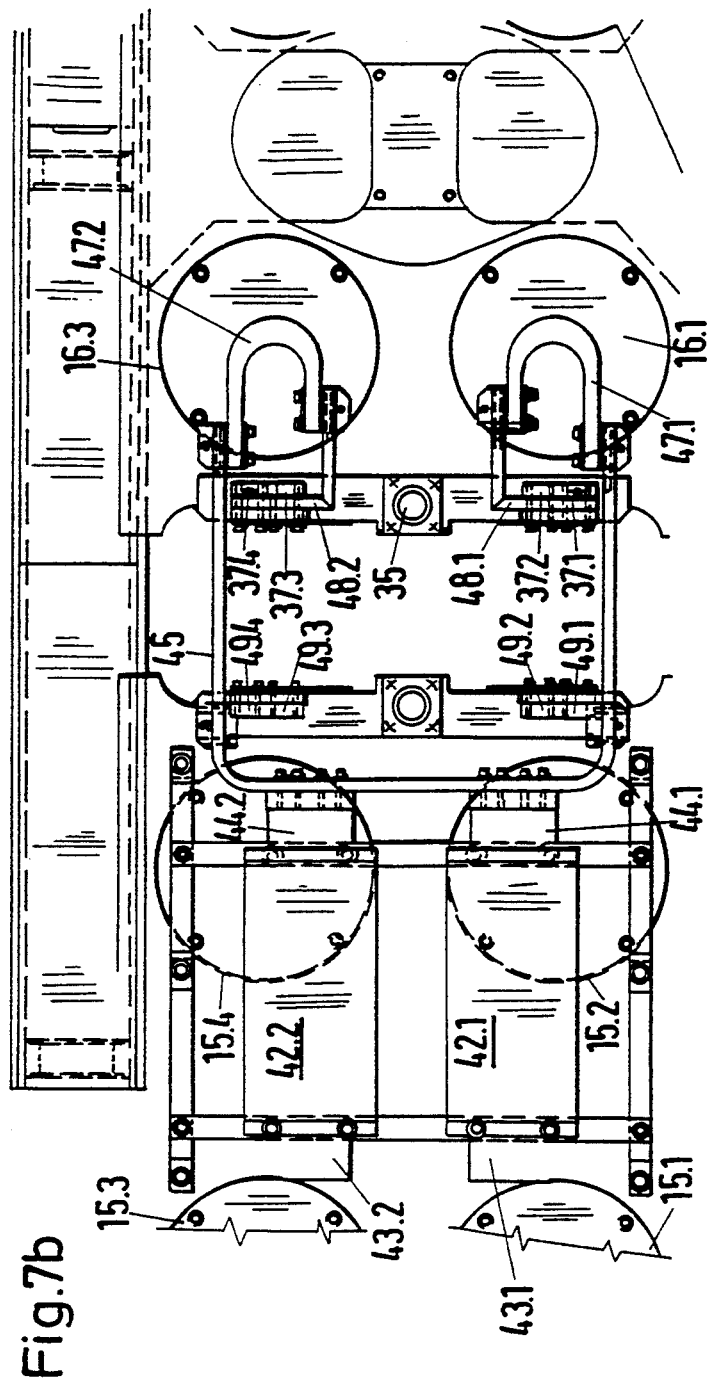

FLASH BUTT WELDING FACILITY

FIELD OF ART

The invention relates to a flash butt welding facility for welding together profiled workpieces, especially rails and pipes, comprising (a) two clamping systems displaceable relatively to each other for retaining and positioning the profiled workpieces on a geometrical workpiece clamping axis, wherein the clamping systems are accessible from a first side perpendicularly to the workpiece clamping axis, and (b) a device for displacing the clamping systems, particularly for upsetting the profiled workpieces during welding.

STATE OF THE ART

During the installation of new railway tracks or during the repair of existing track systems, it is necessary to weld together abutting rail ends. Mobile rail welding facilities of the type discussed above have, therefore, been developed.

For example, EP-0 326 793 discloses a movable electric flash butt welding machine including a rail pulling device in the horizontal plane of the rails. This device encompasses the rail joint in annular fashion. Two drive cylinders are arranged to the left and to the right of the rail joint. The rails are fixed in place between clamping jaws by means of a toggle lever unit. The welding electrodes are designed as pairs of clamping jaws. They are pressed against the rail with separate cylinders. The welding device is arranged within the annular rail pulling unit.

Although very high tensile and compressive forces can be generated with this flash butt welding system, it is necessary, before and, respectively, after each welding step, to utilize and, respectively, release yoke members and pins so that the rails can be clamped into the drive system and, respectively, can again be removed therefrom.

U.S. Pat. No. 4,410,780 describes a rail welding machine with two gripping tongs having conductive clamping jaws. The gripping tongs are arranged on a joint bar which simultaneously constitutes the axis of rotation. One of the two gripping tongs is movable along the bar. A flash trimming device operates independently of the gripping tongs and can be displaced separately in the longitudinal direction of the rail by means of a cylinder. This welding machine, though relatively compact, has limitations with regard to possibilities and accuracies of adjustment due to the joint guide bar.

Representation of the Invention

It is an object of the invention to indicate a flash butt welding facility of the type discussed hereinabove which is distinguished by a compact, i.e. space-saving structure, requires a minimum of manual labor during operation, and is usable as a mobile rail welding facility.

According to the invention, this object has been attained in that the device for shifting the clamping systems exhibits at least one compressive force generator in operative connection with the one clamping system in rotatable fashion and with the other clamping system by way of at least one lever, this compressive force generator being arranged on a second side lying in diametrical opposition to the accessible first side with regard to the workpiece clamping axis and operating essentially in the direction of the workpiece clamping axis, wherein the lever is rotatably connected with the other clamping system in a force application point located close to the workpiece clamping axis.

Thus, the force for pulling the profiled workpieces toward each other is not produced at the level of the clamping axis, for example laterally beside the rails (i.e. in the horizontal plane of the rails) but rather typically thereabove, for example with two hydraulic cylinders. Two levers movable in a vertical plane are utilized, for example, for transmitting and, respectively, guiding the tensile force into the clamping axis. Consequently, the tensile force acts substantially in the longitudinal axis oft he profiled workpieces, resulting in small bending forces of the mechanical supporting structure.

Preferably, a two-armed lever is employed. Good force transmission relationships can be realized with the aid of such a lever.

The device for shifting the clamping systems preferably comprises a slide supported in a housing to be linearly displaceable. The at least one lever is rotatably connected, in its associated force application point, with this slide. At least one pull rod is rotatably mounted, on the one hand, to the housing and, on the other hand, to a lever. The at least one pull rod is located between the tensile force generator and the clamping axis. Thereby, a symmetrical arrangement is produced with an advantageous force and torque distribution.

According to an especially preferred embodiment, contact electrodes are provided designed so that the profiled workpiece is contacted in each case on the outsides of its head and/or its base. This affords great advantages, for example, in rail welding when the rails are being prepared since the indispensable grinding off of the rail surface need not be carried out with great effort at the web or, respectively, underneath the head, but rather conveniently on the convex outside of the rail profile.

Preferably, the contact electrodes in each case form approximately V-shaped openings for accommodating the profiled workpieces with an only minor amount of play. The profiled workpieces can be introduced perpendicularly to the clamping axis (for example from below) (for instance by lowering the welding facility onto the workpieces lying on the ground) and can then be pressed in place by the clamping systems. The electrode arrangement is preferably rigid, i.e. it is not designed as a movable clamping jaw device. The principle of the V-shaped openings between the electrode parts is eminently suitable for positioning rails on the driving edge.

It is furthermore advantageous to provide the flash butt welding facility with a flash trimming device having blades that can be swung inwards and outwards; these blades are mounted, in the swung-out position, within or behind a plane defined by the front side of a welding electrode facing the welding site, and they are also mounted outside of the contact electrode. The salient point resides in that the blades, during the welding operation, are mounted in a position wherein they are protected from metal spatter.

The blades are adapted to the profile of the workpieces and can be displaced together with the slide. In the inwardly swiveled position, the blades rest on the contact electrodes. During the flash trimming step, these blades are pushed together with the contact electrodes over the weld seam site by means of the compressive force generators (compression cylinders). The flash trimming device thus does not require any separate hydraulic cylinders or the like.

It is especially advantageous to provide that the blades are swivelable about axes of rotation arranged in such a way that the resistance forces occurring during the flash trimming step lead to torques urging the blades against the rail and onto the contact electrodes.

According to another advantageous embodiment, the clamping system comprises eccentric presses. Per rail end, four eccentric shafts disposed in pairs are preferably provided. They are utilized with preference in combination with the V-shaped contact electrodes in order to press the rails against one of the two flanks of the contact electrodes.

The clamping system preferably comprises, as eccentric presses, shafts mounted orthogonally to the workpiece clamping axis, with eccentrically supported clamping bars to clamp the profiled workpiece in place. The clamping bars are pivotable about a horizontal axis, especially an axis in parallel to the clamping axis, and engage at the profile web below the profile head. The clamping bars can be designed, instead of being pivotable, also to be vertically adjustable in some other way.

Advantageously, an elevating cylinder aligned perpendicularly to the workpiece clamping axis is included, operating the pivotable clamping bars by means of pull rods (in a more or less synchronous fashion). The clamping bars can also be equipped with separate drive means.

By the upward swinging of the clamping bars, the profiled workpiece can be pressed against a stop which latter is vertically adjustable. Such a stop can be constituted, for example, by a spindle installed perpendicularly to the workpiece clamping axis.

According to an especially preferred embodiment, the clamping system for clamping a profiled workpiece in place comprises four eccentric shafts wherein respectively two eccentric shafts arranged on the same side of the clamping axis are driven by a joint hoisting cylinder engaging with one end at one eccentric shaft and with the other end at the other eccentric shaft. This has the advantage that the active force as well as the reactive force can be exploited for the pressing step. Synchronism of the eccentric shafts being driven by the joint hoisting cylinder can be ensured by an additional tie rod.

According to another preferred embodiment, four adjusting profiles arranged along the clamping axis are provided for the adjustment of the profiled workpieces to be welded together; preferably, two of these adjusting profiles are constituted by the contact electrodes. At least one clamping press is located between two adjusting profiles arranged in series (in the longitudinal direction of the axis). Each adjusting profile offers at least one angular abutment. The clamping presses engage the profiled workpieces in such a way that the latter are pressed with the edges in adjustment into the aforementioned angular stop. For example in case of a rail welding facility, the rail is pressed with its head into the "adjusting corners". In this manner, a precise adjustment to the driving edge can be attained with simple means.

The invention is not limited to the combination of pulling device, clamping device, flash trimming device, driving edge adjustment, and electrode shape. The corresponding groups of features can, after all, also be embodied independently of one another. Thus, it is possible, for example, to utilize the flash trimming device independently of the other groups of features. The same holds true for the pulling device, the clamping system, the adjusting system, and the electrode configuration.

Additional preferred feature combinations can be derived from the entirety of the claims and the detailed description.

BRIEF DESCRIPTION OF THE DRAWINGS

The invention will be described in greater detail below with reference to embodiments and in conjunction with the drawings wherein:

FIG. 5 shows the clamping system illustrated in FIG. 4 in a view from above;

FIGS. 7a, b show the transformers from the side and from above;

In the drawings, identical parts are identified basically by the same reference symbols.

WAYS OF EXECUTING THE INVENTION

Figure 1:
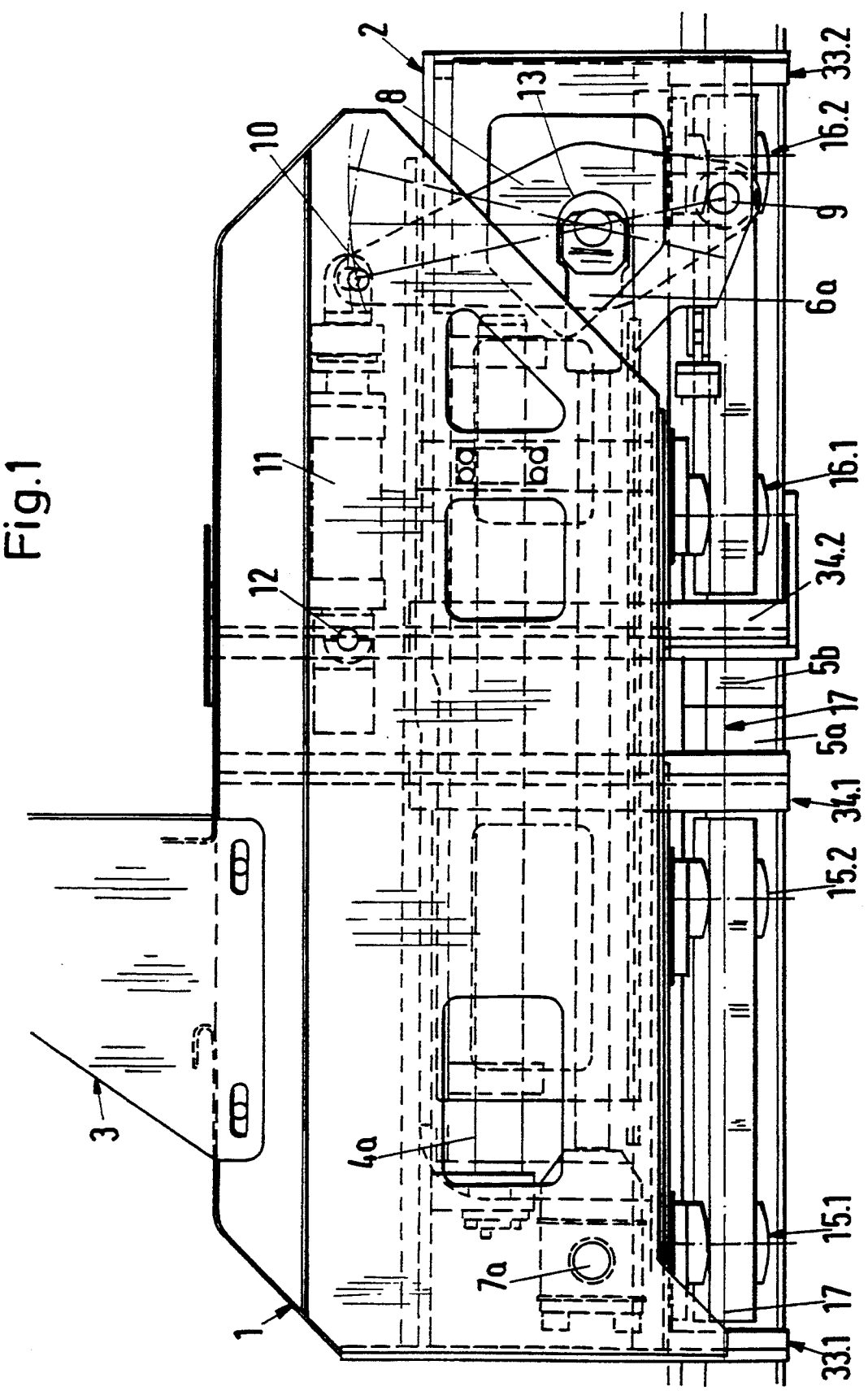
FIG. 1 is a lateral view of the rail welding facility.
Figure 2:
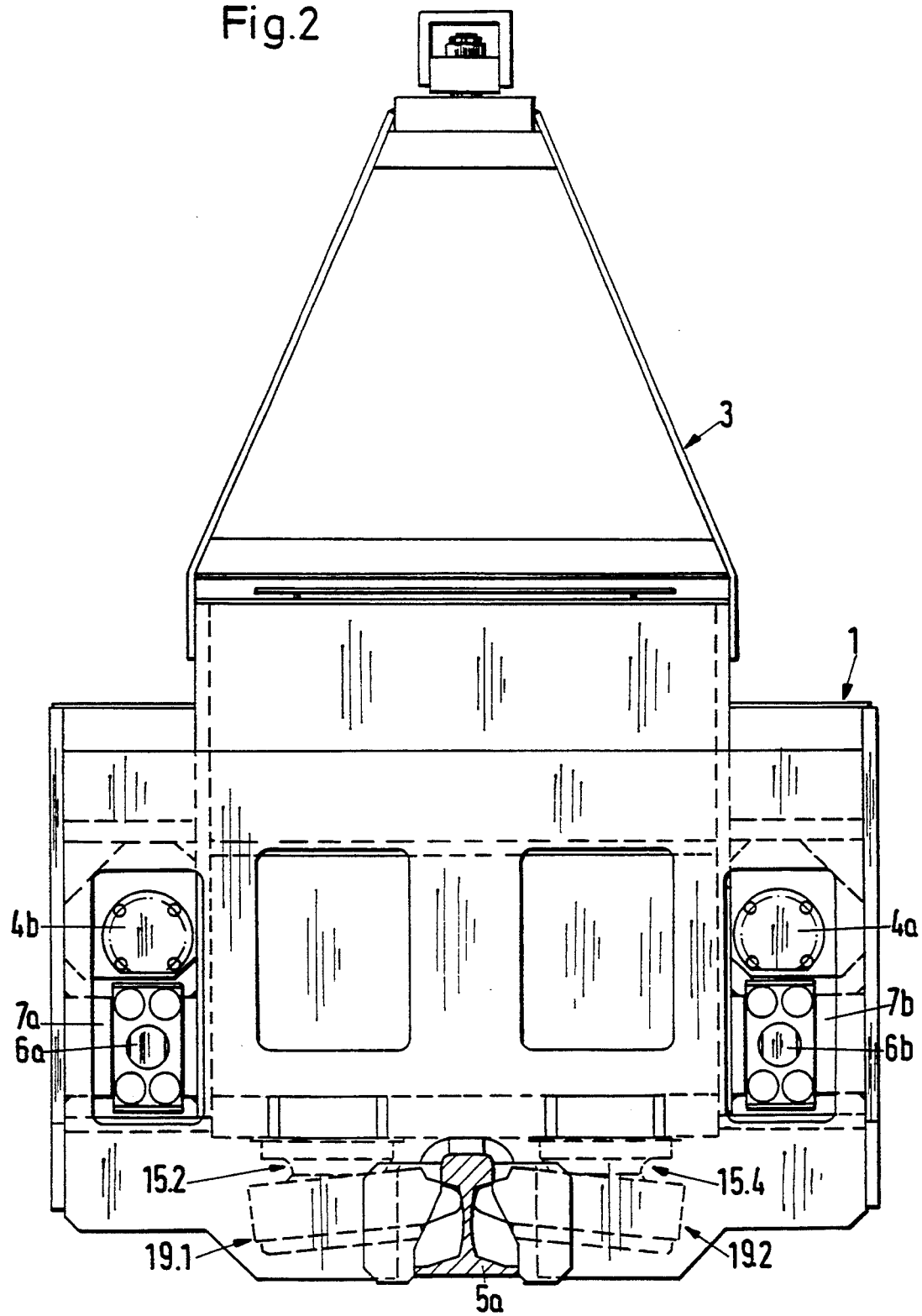
FIG. 2 is a longitudinal view in the rail abutment plane.

FIGS. 1 and 2 show, along the lines of one embodiment, a mobile rail welding facility from the side and in an axial cross-sectional view. The entire structure depicted in FIGS. 1 and 2 is suspended to be vertically adjustable and laterally displaceable, for example, in a rail vehicle or a pneumatic vehicle. According to the invention, the mobile rail welding facility comprises a housing 1 wherein a slide 2 is supported to be linearly displaceable. A suspension structure 3 (for example a frame with hooks) is mounted to the top of the housing 1. The entire rail welding facility is suspended on this suspension structure in the vehicle mentioned above by example.

The housing 1 and the slide 2 are frame-like metal structures. Two guide rods 4a, 4b are mounted in the housing 1 in the proximity of the longitudinal sidewalls. The slide 2 is displaceably supported on these guide rods. To ensure electrical insulation between housing 1 and slide 2, the guide rods 4a, 4b are retained in the housing 1 by means of electrical insulators. The sliding bearings between the slide 2 and the guide rods 4a, 4b, however, are not insulated. Consequently, the guide rods 4a, 4b are at the same potential as the slide 2. As will be described in greater detail below, the guide rods 4a, 4b and, respectively, the sliding bearings are not exposed to particularly high bending moments during the compression of the rails. In order to reduce the weight of the rail welding facility, these rods can thus be designed as hollows shafts.

Respectively one clamping system to retain the rail ends 5a, 5b to be welded together is installed in the housing 1 and in the slide 2. The rail ends 5a, 5b are retained by the clamping systems on a joint rail clamping axis 17 (in parallel to the longitudinal axis of the rail welding machine and preferably in the vertical longitudinal plane of symmetry thereof).

During a flash butt welding operation, the rail ends 5a, 5b, as is known, must first be vigorously joined together and must finally be vigorously compressed. The tensile force required for this purpose is advantageously produced and rendered effective, according to this invention, as follows.

Two pull rods 6a, 6b are provided, for example, underneath the guide rods 4a, 4b. These pull rods extend substantially in the direction of the longitudinal axis of the rail welding facility and are anchored in insulated fashion at the housing 1 on one end by means of bearing axles 7a, 7b. The bearing axles 7a, 7b are disposed horizontally and permit a pivotal movement of the pull rods 6a, 6b in a vertical plane. Since the pulling device is designed essentially in mirror-image symmetry to the longitudinal central plane, the following description will refer merely to one half.

The other end of the pull rod 6a is articulated to a lever 8 likewise pivotable in a vertical plane. The lever 8 has two arms with reference to the aforementioned connecting point. The lower one of these two arms is connected to the slide 2 at the level of the rail clamping axis 17 by means of a bearing axle 9. The upper arm is connected with its end in a swivel pin 10 to the piston of a press cylinder 11 lying in the longitudinal direction. The press cylinder 11, in turn, is connected to the housing 1 by means of a (horizontal) bearing axle 12.

Respectively one clamping system for seizing and retaining the rail ends 5a, 5b is installed in the housing 1 and in the slide 2. By means of the mechanism of this invention, the rail ends 5a, 5b are pressed together according to the following operation principle. The press cylinder 11 pushes the upper arm of the lever 8 toward the right as seen in the illustration of FIG. 1. The bearing axle 13, located approximately in the middle of the lever 8, is forced by the pull rod 6a to execute a circular arc about the bearing axle 7a. For this reason, the bearing axle 9 and thus the slide 2 are shifted into the housing 1, i.e. toward the left as seen in FIG. 1. The bearing axle 9 moves on a strictly linear route in parallel to the rail clamping axis 17 (due to the guidance of the slide 2 according to this invention). The bearing axle 9 represents the force application point of the lever. In this point, the displacement force of the pressure cylinder 11 is transmitted to the slide 2 and thus to the corresponding clamping system. According to the invention, the aforementioned force application point is provided in closest possible proximity to the rail clamping axis 17. In other words, an (imaginary) straight line passing through the bearing axle 9 should preferably intersect the geometrical workpiece clamping axis 17 or should have a minimum spacing therefrom.

The advantage of this arrangement resides in the symmetrical load on the housing/slide construction. This is due to the fact that the pull rods 6a, 6b lie between the pressure cylinders associated therewith (active forces) and the rails (i.e. the reactive forces). Undesirable bending moments on the housing structure are extensively avoided. Furthermore, the space at the level of the rails is kept vacant by the construction of this invention.

The clamping systems unilaterally accessible in accordance with this invention will now be explained with reference to FIGS. 3–5.

Figure 3:
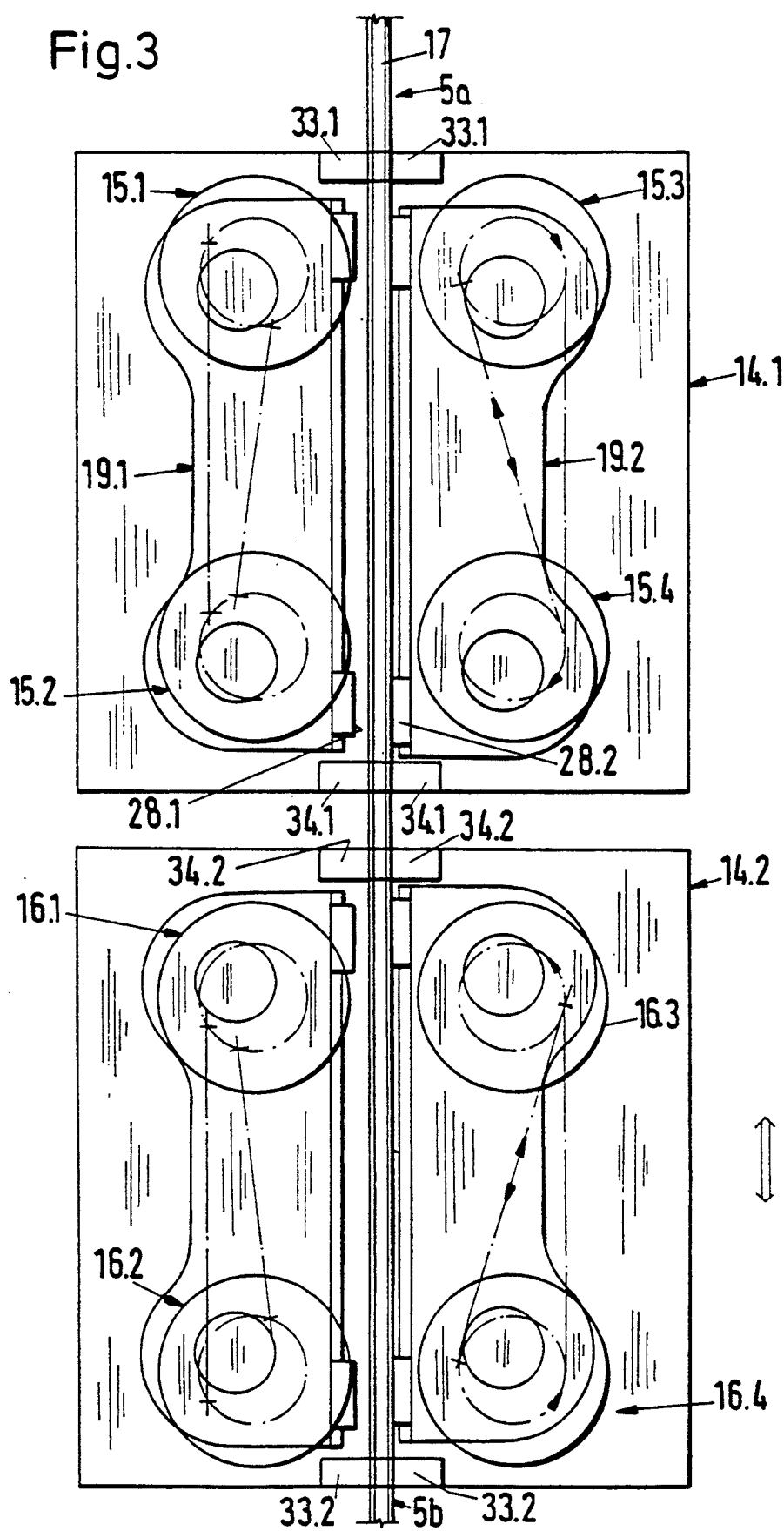
FIG. 3 is a schematic representation of the clamping systems.

FIG. 3 illustrates the principle. Each clamping system 14.1, 14.2 comprises four eccentric shafts 15.1, 111, 15.4 and, respectively, 16.1, . . . , 16.4. The eccentric shafts 15.1, . . . , 15.4, 16.1, . . . , 16.4 are arranged in paired opposition (15.1 and 15.3, 15.2 and 15.4, 16.1 and 16.3, 16.2 and 16.4) along the rail clamping axis 17. They are located vertically, i.e. substantially orthogonally to the workpiece clamping axis and equipped in pairs with eccentrically supported clamping bars 19.1, 19.2 pivotable about a horizontal axis in parallel to the rail clamping axis 17. (Each clamping bar, for example 19.1, is moved by two synchronous eccentric shafts, e.g. 15.1, 15.2.) By rotating the shafts, the clamping bars 19.1, 19.2 can be moved toward and, respectively away from the rail clamping axis.

According to the invention, two eccentric shafts arranged on the same side of the rail clamping axis 17 are combined into one functional unit. As can be derived from FIG. 5, respectively one pressure cylinder 20.1, 20.2 eccentrically engages at each of the associated shafts (bearing pins 21.1, 21.2 and, respectively, 21.3, 21.4). The bearing pins 21.1, 21.2 and, respectively, 21.3, 21.4 are arranged so that actuation of the press cylinder 20.1, 20.2 leads to a rotation in the same direction of the two functionally combined shafts (15.1, 15.2 and, respectively, 15.3, 15.4). Furthermore, the eccentric shafts 15.1, 15.2 and, respectively, 15.3, 15.4 operated by the same pressure cylinder are coupled with respect to motion with coupling rods 22.1 and 22.2, respectively (engaging at eccentrically arranged pins 23.1, . . . , 23.4). Each expansion of the pressure cylinder can thereby be associated with an unequivocal position of the eccentric shafts 15.1, . . . , 15.4. The just-described construction has the advantage that the active as well as reactive force in the pressure cylinders can be exploited for retaining the rails.

In order to monitor the positions of the eccentric presses, limit switches 18.1, . . . , 18.4 can be provided. They indicate the attainment of an end position. Of course, it is also possible to provide position sensors exactly indicating the position assumed by the eccentric presses. It is then also possible to weld the rails together in a middle-centered position with corresponding adaptation of the current introduction.

As mentioned above, the clamping bars 19.1, 19.2 are supported to be pivotable, preferably in the manner of a ball-and-socket joint, on the eccentric shafts 15.1 and 15.2, respectively 15.3 and 15.4. The pivotal motion is controlled by a vertically aligned elevating cylinder 24 centrally arranged in the clamping system. A coupling member 26 is moutned to its upwardly urgeable piston 25. This coupling member is rotatable about a horizontal axis in parallel to the rail clamping axis. On both sides of the central axis of the coupling member 26, respectively one pull rod, e.g. 27 (see FIG. 4) is articulated. The lower end of the pull rod 27 is respectively articulated to the corresponding clamping bar 19.1 and 19.2.

Upon actuation of the elevating cylinder 24, the coupling member 26 is urged upwards by the piston 25 whereby the two clamping bars 19.1, 19.2 are likewise swung upwardly (for example from −6° to +6° by about 20 mm). The articulated support of the coupling member 26 uniformly distributes the tensile forces onto the two clamping bars 19.1 and 19.2.

On their sides facing the rail clamping axis, the clamping bars 19.1 and 19.2 ehxibit lugs 28.1, 29.1 and, respectively, 28.2, 29.2. These lugs 28.1, 28.2 and 29.1, 29.2 are arranged so that they engage, during the clamping of the rail and during the upward swing of the clamping bars 19.1 and 19.2, at the upper portion of the rail web 30b and, respectively, at the rail head 30a on the bottom. On account of the reciprocating cylinder 24, the rail head 30a is urged from below against a spindle tip 31. The ends of the rails to be welded together are mutually adjusted vertically by adjusting the level of the spindle tip 31.

Figure 6A:
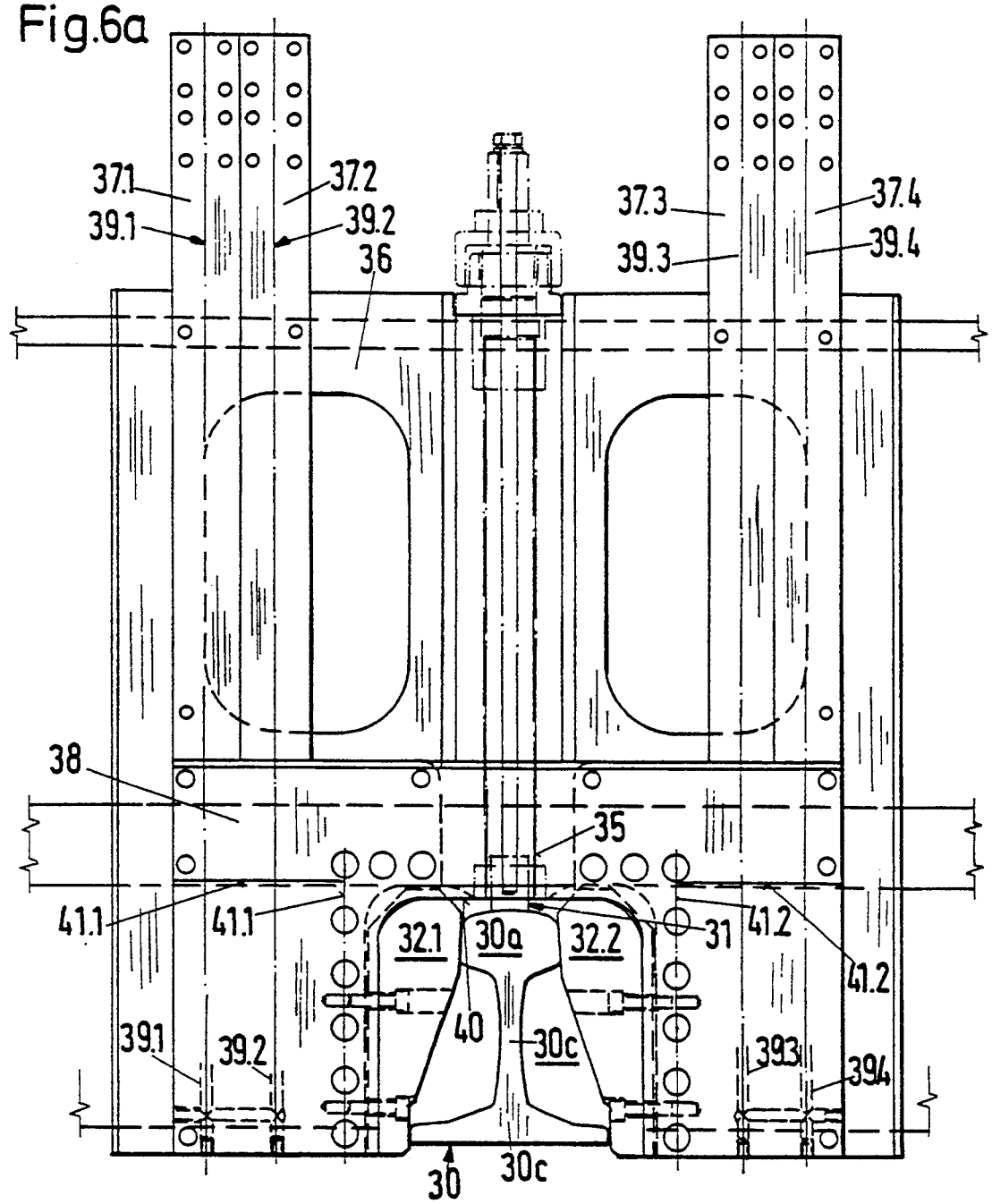
FIGS. 6a, b show the electrode arrangement in the rail joint plane (FIG. 6a) and from above (FIG. 6b)
Figure 6B:
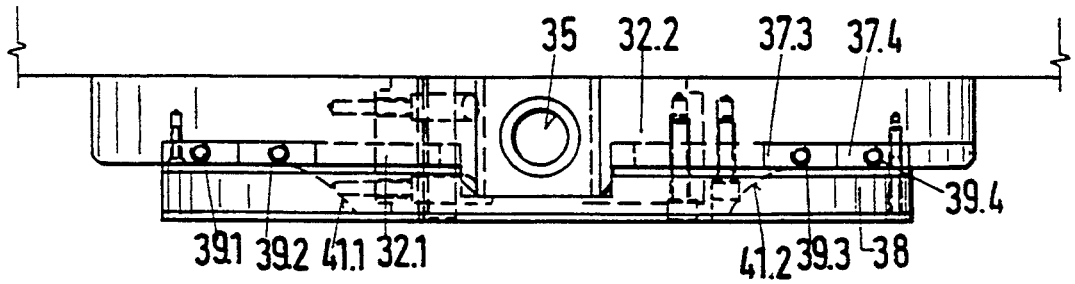

FIGS. 6a, 6b show the electrode arrangement. Contacting of the rail in accordance with this invention is distinguished in that it takes place, rather than "on the inside", i.e. at a concave part of the profile (e.g. at the web 30b), "on the outside", i.e. at a convex part, especially laterally at the rail head 30a and at the rail base 30c. According to the invention, two electrode parts 32.1, 32.2 are fixedly provided at the frame structure of the housing 1. They are of such a shape that a passage is formed between them which narrows in a V-shape perpendicularly to the clamping axis and extends in the axial direction. The constriction runs from the bottom toward the top, namely to such an extent that the rail profile can be accommodated with little clearance. A lateral adjustment takes place by stop surfaces (for the outer sides of the rail head 30a and of the rail base 30c) formed at the electrode parts 32.1, 32.2.

Accordingly, the two electrode parts 32.1, 32.2 constitute an adjusting profile 34.1 (compare, in this connection, FIG. 1). The slide 2 likewise carries two such electrode parts in fixed mounting (with respect to the slide 2), forming an adjusting profile 34.2. Two further adjusting profiles 33.1, 33.2 are provided at the two ends of the rail welding facility. However, these latter profiles, as contrasted to the electrode parts, do not consist of copper but rather, for example, of wear-resistant steel. As can be seen from FIG. 1 and FIG. 3, respectively two eccentric presses (compare FIGS. 3-5) are located between respectively two adjusting profiles 33.1 and 34.1, respectively, 34.2 and 33.2. This structure in accordance with the invention permits a simple driving edge adjustment of the installed rails. This is accomplished by the feature that the rail profiles are introduced into the adjusting profiles 33.1, 33.2, 34.1, 34.2 (for example by lowering the rail welding facility onto the installed rails), the eccentric presses are placed under a relatively low pressure (rail is seized by the clamping system), the rail heads are lifted by operating the elevating cylinder 24, and then the rail profiles are pressed with full force, exerted by the eccentric presses arranged on one side, against the oppositely located side of the adjusting aids (electrodes, spindle tips, etc.).

Thus, in the illustration according to FIG. 3, for example, the schematically indicated eccentric shafts 15.3, 15.4, 16.3 and 16.4 are placed under high pressure so that the rails in the illustration according to FIG. 3 are pressed against the abutment surfaces of the adjusting aids (or electrodes) on the left-hand side. The rail ends are consequently aligned with respect to each other as regards their left-hand edges.

This type of adjustment has the advantage that it is possible to weld together, with driving edge adjustment, even rails showing differently large amounts of wear and tear, and, respectively, new rails to old rails.

Figure 4:
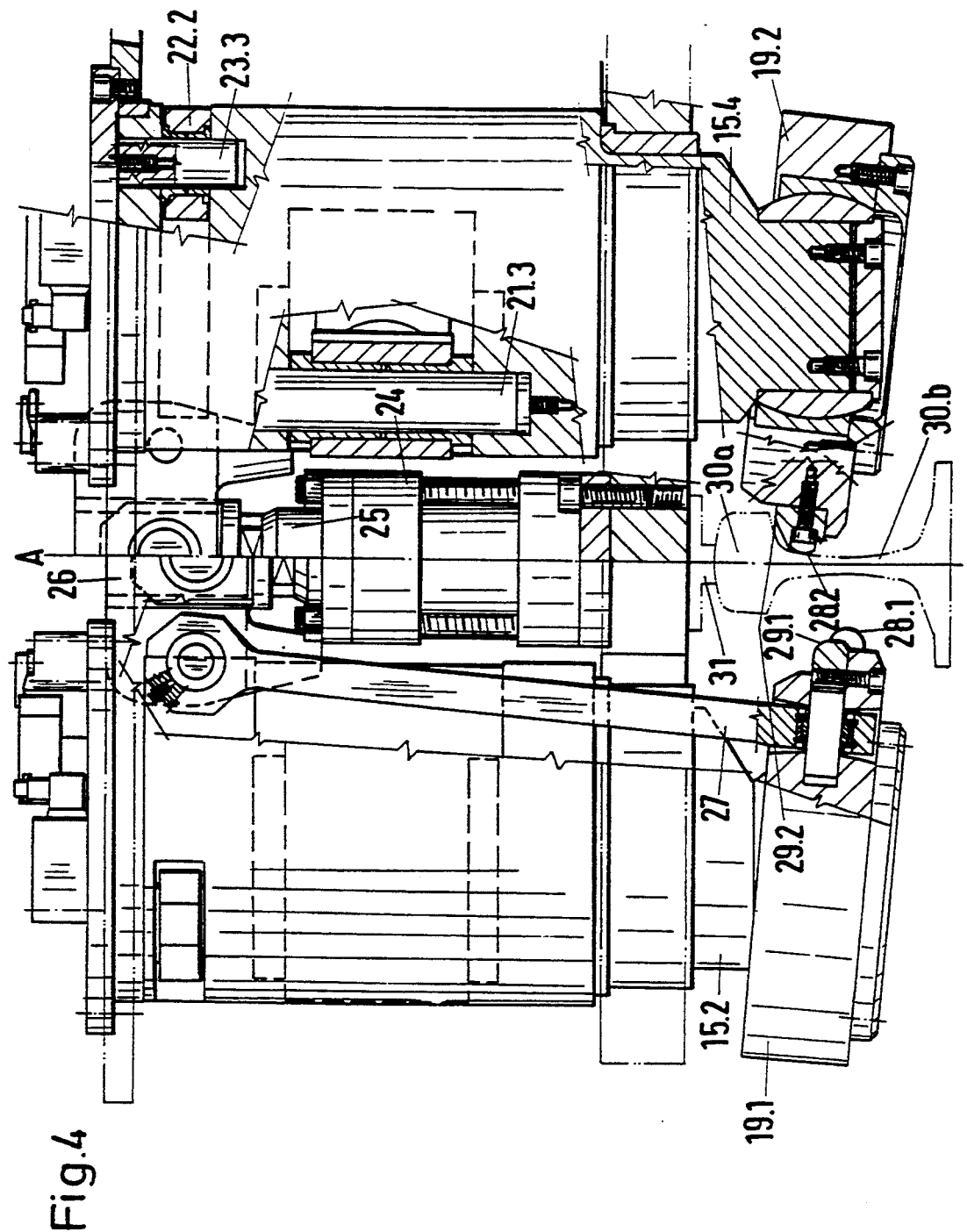
FIG. 4 is a frontal view of the clamping system.

FIGS. 6a, b show a bore 35 in which a spindle is supported for adjusting the rail height (compare, in this connection, FIG. 4: spindle tip 31). As has now been found, the spindle tip 31 limits the rail accommodation space laterally framed by the electrode parts 32.1, 32.2 in the upward direction, since this spindle tip is provided between the aforementioned electrode parts 32.1, 32.2.

The principle of the adjustment according to this invention thus resides in that two abutment surfaces oriented at an angle to each other (for example one side of the electrode and the spindle tip) are provided along the lines of an angular stop, and that the rail is pressed by means of a press device into this angular stop. Thereby an adjustment can be obtained in two mutually perpendicular directions.

The electrical portion of the rail welding facility will be described below. Since the current supply for the electrodes mounted to the housing is constructed to be extensively symmetrical to that mounted to the slide, only that of the slide will be explained in detail hereinbelow.

Two pairs of bus bars 37.1, 37.2 and 37.3, 37.4 are mounted to a supporting structure 36 (for example of steel). These bus bars are vertically aligned and extend from the top where transformer connections are provided down to the very bottom where the electrode parts 32.1, 32.2 are arranged. Two current feeds are formed by the two pairs of bus bars 37.1, 37.2 and 37.3, 37.4. The two directly adjoining bus bars 37.1, 37.2 and, respectively, 37.3, 37.4 are equipped with cooling ducts 39.1, 39.2 and 39.3, 39.4, respectively. The cooling ducts 39.1, ..., 39.4 penetrate the bus bars 37.1, ..., 37.4 in the longitudinal direction in such a way that, at each current feed, a cooling medium can be supplied from above and can also be removed again at that point. The simplest structure resides in that the neighboring bus bars 37.1, 37.2 comprise each one longitudinal bore and a cross bore connecting the bus bars at the lower end.

A copper block 38 (base electrode) is welded from the front onto the bus bars 37.1, ..., 37.4. This block connects the four bus bars 37.1, ..., 37.4 electrically with one another. In the region of the rail clamping axis, the block has a U-shaped recess 40. The electrode parts 32.1, 32.2 are attached on the two sidewalls of this recess 40.

The supporting structure 36 on which the copper block 38 is mounted likewise exhibits a corresponding U-shaped recess on the rail clamping axis. The electrode parts 32.1, 32.2 are wider than the thickness of the copper block 38 and, in the present embodiment, are fixedly threaded not only to the copper block 38 but also to the supporting structure 36.

The copper block 38 furthermore has flat recesses 41.1, 41.2 on both sides of the U-shaped recess 40 at the level of the rail clamping axis; the blades of the flash trimming device, described further below, can be inserted in these flat recesses. The lateral recesses 41.1, 41.2 extend in the vertical direction at least over the vertical region occupied by the recess 40. This corresponds to somewhat more than the height of the rail 30.

The electrode block mounted to the housing need not exhibit these recesses 41.1, 41.2 since there is no flash trimming device mounted to the housing, either.

FIGS. 7a, 7b show the portion of the welding current circuit not described thus far. Two welding transformers 42.1, 42.2 are mounted laterally side-by-side, for example, at the top of the supporting structure 36. These transformers are oriented in parallel to the longitudinal axis (rail clamping axis) of the rail welding facility. Primary connections 43.1, 43.2, not illustrated in detail, are located on the side of the welding transformers 42.1, 42.2 facing away from the welding plane. The two welding transformers 42.1, 42.2 are connected in parallel on the secondary side. One side of the secondary connections 44.1, 44.2 is connected to a bus bar 45 bent into a U shape. The two lateral branches of this U-shaped bus bar 45 extend (in parallel to the longitudinal axis) past the plane defined by the rail junction into the zone of the displaceably supported slide (compare FIG. 1, reference numeral 2). A second bus bar 46 connects the second connections of the secondary side to bus bars 49.1, . . . , 49.4 which are designed and/or arranged in mirror-image fashion to the bus bars 37.1, . . . , 37.4 described above.

Flexible strip conductors 47.1, 47.2 are fixedly threaded to the banches of the bus bar 45. These strip conductors are connected at their second end to the bus bars 48.1, 48.2 affixed to the slide. Due to the fact that the strip conductors 47.1, 47.2 are folded back on themselves in a U shape, the slide can be shifted without there being any change in a contact point (as provided, for example, by sliding contacts).

The bus bars 48.1, 48.2 are then connected to the vertical bus bars 37.1, . . . , 37.4.

The circuit on the secondary side of the welding transformers 42.1, 42.2 then has the following design: First terminal of the secondary sidebus bar 45—strip conductors 47.1, 47.2 (connected in parallel)—bus bars 48.1, 48.2 (connected in parallel)—bus bars 37.1, . . . , 37.4 (connected in parallel)—copper block 38 (compare FIGS. 6a, 6b)—electrode parts 32.1, 32.2—rail end 5b—rail end 5a—electrode parts, copper block and bus bars 49.1, . . . , 49.4 (analogously to FIGS. 6a, 6b)—bus bar 46—second side of the secondary terminals 44.1, 44.2 of the welding transformers 42.1, 42.2.

Figure 8:
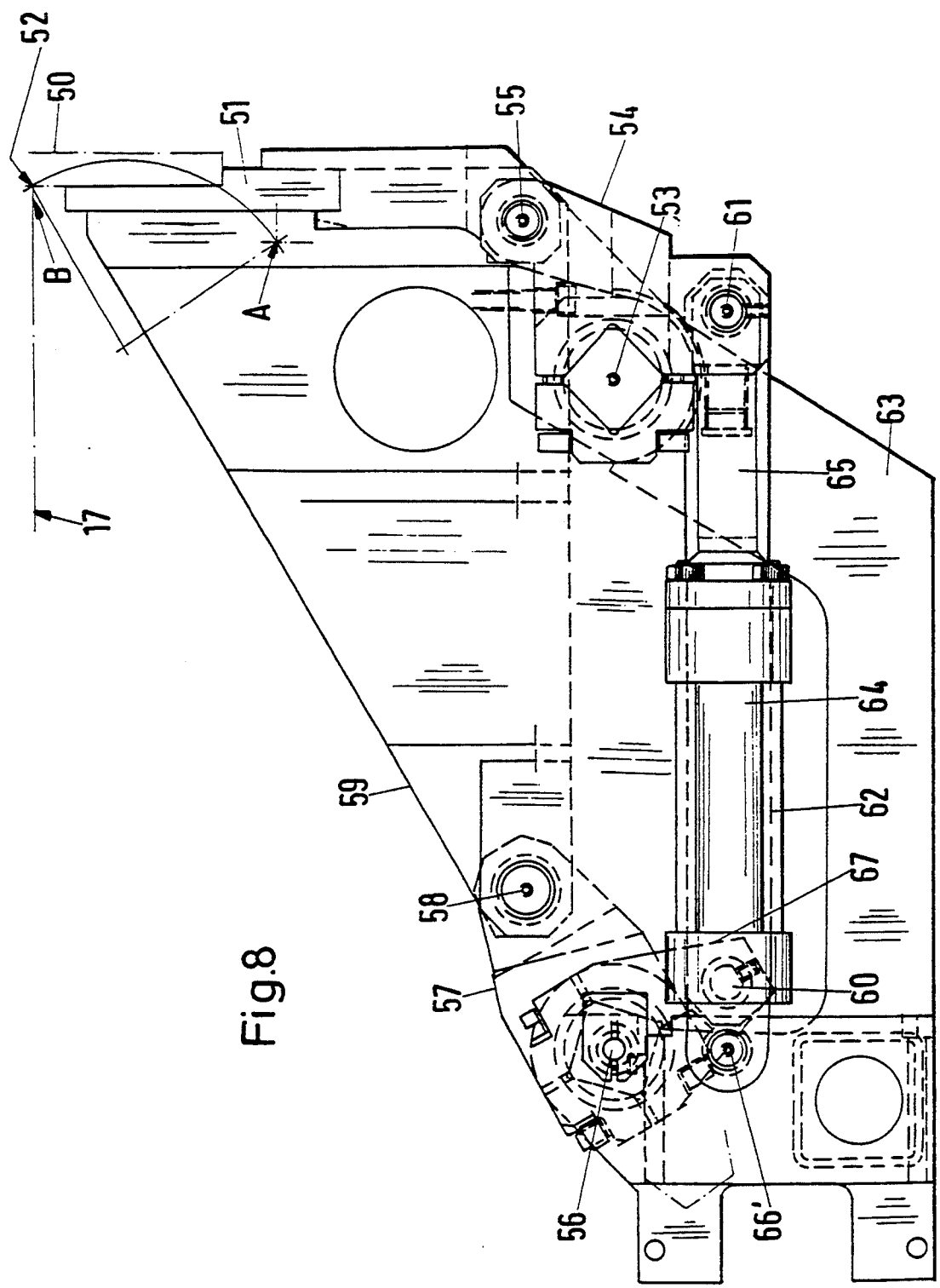
FIG. 8 is a unilateral illustration of the flash trimming device from above.
Figure 9:
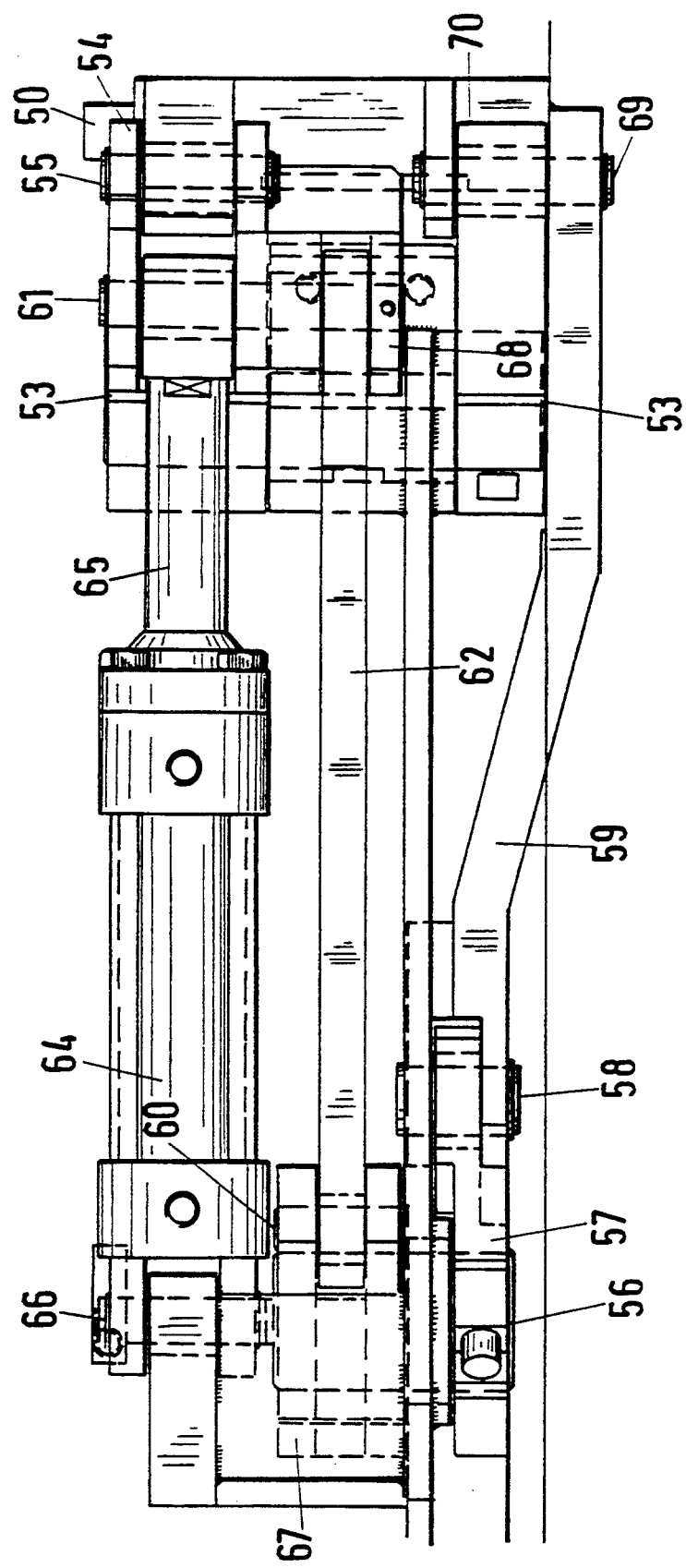
FIG. 9 shows a unilateral view of the flash trimming device from the side.

With reference to FIGS. 8 and 9, a preferred embodiment of a flash trimming device according to this invention will next be explained. During welding, a bead of material is produced at the rail joint; this bead must be removed. In principle, this can be done with conventional devices. However, preferably, two blades—one of which is indicated in FIG. 8 by reference numeral 50—are provided, for example, which can be swung inwards and outwards and form a free space between them corresponding precisely to the profile cross section of the welded rail. The flash trimming device in its entirety and the blades in particular are designed to be in mirror image arrangement to a vertical plane wherein the rail clamping axis extends. Therefore, only one of the two halves of the device will be described below.

The blade 50 is a plate pivotably held by a holder 51 perpendicularly to the rail clamping axis 17. The side facing the rail clamping axis 17 exhibits a recess corresponding to half the rail profile (the negative one).

By means of a suitable mechanism, the blade 50 is swung inwards and outwards in such a way that a forward corner point 52 of the blade 50 can be moved from a swung-out position A into a swung-in position B. From point A to point B, the corner point 52 travels along a circular arc with a center angle of about 90°.

In the inwardly swung position, the blades are in flat contact with the contact electrodes. During the flash trimming step, the latter offer good support to the blades. The pivoting mechanism consequently is not stressed essentially by the occurring forces during flash trimming.

During the flash trimming step, considerable friction forces are produced between the blade and the rail, these forces acting not only in the travel direction of the blade 50 but also to a certain part perpendicularly thereto. According to the invention, the pivoting mechanism is designed so that the friction forces lead to a torque in the pivoting mechanism which torque presses the blade 50 against the rail and the electrode.

The blade 50 is retained by the aforementioned holder 51. The holder 51 is supported by a triangular supporting plate 59. The latter engages at the holder 51 at the bottom and tapers toward the rear (i.e., starting with the blade 50, the plate tapers in a direction oppositely to the flash trimming direction). In top view, the supporting plate 59 is, for example, substantially a right triangle, the short side of which extends perpendicularly to the rail clamping axis, and the other, long side of which extends in parallel to the rail clamping axis 17. The supporting plate 59 is mounted to be rotatable at a rear end by a lever 57 with the aid of an axle 58 and at a front end by a lever 70 with the aid of an axle 69. The holder 51 is held by a lever 54 with the aid of an axle 55 arranged flush with the axle 69. The two axles 58 and 55/69 preferably lie on a line in parallel to the rail clamping axis.

The lever 57 is pivotable about an axle 56 and the levers 54, 70 are pivotable about an axle 53. The levers 54 and 70 are arranged one above the other and move in synchronism (identical position). The two vertical axles 56 and 53 are fixed with respect to a slide frame 63, the latter carrying the entire flash trimming device. The axles 56 and 53, by the way, have the same mutual distance as the axles 58 and 55/69 and lie on a line in parallel to the last-mentioned axles.

A coupling rod 62 is articulated with its ends, on the one hand, at a lever 67 and, on the other hand, at a lever 68 (compare FIG. 9). The lever 67 is rotatable in a rigid 90° angle with respect to the lever 57 about the axles 56. Analogously, the lever 68 is rotatable in a rigid angle with respect to the lever 54 about the axle 53. In this way, the blade 50 can be swung inwards and, respectively, outwards in a stable and parallel fashion. Problems while passing through dead center are thus avoided.

The inward and outward pivoting is brought about by an elevating cylinder 64. The latter is rotatably anchored at the slide frame 63 by an axle 66. The axle 66 is located preferably (in the direction of the clamping axis) at the same level as the axle 56. The piston rod 65 of the elevating cylinder 64 is articulated in an axle 61 to the lever 54. As can be seen from FIG. 9, the vertical axles 55 and 69 (as mentioned above) are aligned in flush manner. Furthermore, it is to be noted that the piston rod 65 and the coupling rod 62 are connected by an axle 61 common to both of them.

In FIG. 8, the blade 50 is shown in the inwardly swung position. The piston rod 65 is extended and the connecting lines between the axles 56 and 58 and, respectively, 53 and 55 are approximately at a 30° angle to a straight line connecting the axles 56 and 53. The supporting plate 59 is thus pivoted past dead center (wherein the axles 56, 58, 53, 55 are on a joint line) toward the inside (i.e. toward the rail clamping axis). According to the invention, at this pivoting angle, the distance of the corner point 52 from the axle 55, and of axle 55 from the axle 53 (under the given angular relationships) is such that the friction forces during flash trimming lead to a torque (with respect to the axle 53) pressing the blade 50 onto the rail.

As can be derived from FIG. 9, the supporting plate 59 is arranged in the lowermost position, the coupling rod 62 is arranged in the middle, and the elevating cylinder 64 (in the vertical direction) is located at the very top. The supporting plate 59, in the present embodiment (compare FIG. 9) is not of a flat structure but rather has a ramp-like intermediate member. Thereby, it is possible to locate the connection with the axle 58 at a higher level than that with the axle 69. The depth or, respectively, height of the axle 69 is, after all, determined by the bottom side of the rail profile which must likewise be trimmed of flash. The structural height of the rear portion of the flash trimming device thus can be designed to be lower than that of the forward portion.

The rail welding operation with the use of the facility according to this invention proceeds as follows.

First of all, the rail welding facility is lowered upon the abutting ends of the rails 5a, 5b. During this step, the rails pass into the openings of the adjusting profiles 33.1, 33.2, 34.1, 34.2 provided for this purpose. The rail joint comes to lie between the inner adjusting profiles 34.1, 34.2 (= electrodes) (compare FIG. 1).

Secondly, the eccentric presses are applied. All press cylinders (compare, for example, reference numerals 20.1, 20.2 in FIG. 5) are placed under a relatively low pressure so that the clamping bars (compare 19.1, 19.2 in FIG. 4) are urged only slightly against the rails. The clamping bars are pressed by operating the elevating cylinder (compare reference numeral 24 in FIG. 4) upwards against the spindle tip (compare reference numeral 31 in FIG. 4). Thus, the two rail ends are adjusted vertically.

The third step then is the adjustment to the driving edge. For this purpose, the eccentric presses facing away from the driving edge are placed under high pressure so that the two rail ends are urged against the sidewalls of the adjusting profiles 33.1, 33.2, 34.1, 34.2 lying on the side of the driving edge. The eccentric presses arranged on the side of the driving edge are not placed under full power so as not to influence the adjustment process. Of course, care must be taken that the rails, in spite of this, are retained with sufficient force so that they cannot be displaced during the subsequent longitudinal movements.

At this point, conventional techniques of rail welding can be utilized. In this procedure, the slide 2 holding one rail end clamped in place is pushed by means of the press cylinder 11 into the housing 1 whereby the rail ends are slowly moved toward each other. At the same time, strong currents are introduced into the rails by means of the transformers (compare reference numerals 42.1, 42.2 of FIG. 7b). The incandescent rail material which spatters does not hit the flash trimming blades since the latter are accommodated in protected fashion in the outside depressions of the copper blocks (compare reference numeral 38 in FIGS. 6a, b).

Once welding is finished and current has been turned off, the rail section held by the clamping system of the slide is centered in the middle with respect to the adjusting aids and the flash trimming blades (compare reference numeral 50 in FIG. 8) are applied to the rail 5b by actuation of the corresponding elevating cylinders (compare reference numeral 64 in FIG. 8). The eccentric presses of the slide are released, and, with vigorous feed supplied by the press cylinder 11, the slide 2 with the flash trimming blades is pushed past the welding site. The projecting material at the rail joint is thereby removed. It is understood that flash trimming is performed within a minimum time period directly following the compression impact which terminates the welding step.

Finally, the eccentric presses are detached, the clamping bars are swung away, and the rails are released.

The invention is not limited to the embodiment illustrated in the figures. The pulling device for pulling the rails, as well as the clamping device, the flash trimming device and/or the electrode arrangement can be designed differently from the illustration.

In summation, it can be noted that the invention has created an extremely compact and powerful rail welding facility for mobile usage.

I claim:

1. Flash butt welding facility for adjusting the ends of profiled workpieces to be welded together, comprising at least four fixedly mounted adjusting profiles arranged along a workpiece clamping axis, each adjusting profile having at least one angular stop, and clamping presses engage at the profiled workpieces in such a way that the latter are pressed with edge adjustment into said angular stops.

2. Flash butt welding facility according to claim 1 in which two of said at least four adjusting profiles are fashioned as contact electrodes.

3. Flash butt welding facility for welding together a first and a second profiled workpiece, comprising:
   a) a first and a second clamping system for retaining and positioning the first and second profiled workpieces aligned on a workpiece clamping axis, wherein the clamping systems are open to a first side perpendicular to the workpiece clamping axis for receiving the first and second workpieces, respectively;
   b) first and second support means for supporting said first and second clamping systems, respectively;
   c) at least one compressive force generator arranged on a second side of the workpiece clamping axis opposite said first side and in parallel with the workpiece clamping axis for moving the support means relative to each other;
   d) a first end of said at least one compressive force generator being pivotally connected to said first support means;
   e) at least one lever linking a second end of said at least one compressive force generator with said second support means;
   f) the second support means being displaceably supported by guide rod means mounted in the first support means for a strictly linear movement of the second support means with respect to the first support means; and
   g) pull rod means pivotally linking said first support means and said lever at a fulcrum.

4. Flash butt welding facility according to claim 3, wherein the first support means is a housing and the second support means is a slide displaceably supported by said guide rod means in the housing for a linear movement.

5. Flash butt welding facility according to claim 3, wherein the pull rod means comprise pull rods extending substantially parallel to the workpiece clamping axis being connected to the first support means by horizontally disposed bearing axles permitting a pivotal movement of the pull rods in a vertical plane, each pull rod being pivotally connected to a separate lever by horizontally disposed bearing axles.

6. Flash butt welding facility according to claim 5, wherein the levers and the second support means are connected by bearing axles in each case representing a force application point of the lever, an imaginary straight line passing through said bearing axles intersecting the workpiece clamping axis or having a minimum spacing therefrom.

7. Flash butt welding facility according to claim 3, wherein the at least one lever is mounted vertically for a pivotal movement in a vertical plane, the lever having two arms extending from the fulcrum into opposite directions.

8. Flash butt welding facility according to claim 3 for welding together rails, comprising fixed contact electrodes having the form of approximately V-shaped openings for the accommodation of the rails for contacting an outside portion of a head and a base of the rails, the clamping systems pressing the rails into the openings of the fixed contact electrodes.

9. Flash butt welding facility for welding together rails and rail-like profiled workpieces, comprising:
 a first and a second clamping system for retaining and positioning the first and second profiled workpieces aligned on a workpiece clamping axis, wherein the clamping systems are open to a first side perpendicular to the workpiece clamping axis for receiving the first and second workpieces, respectively;
 first and second support means for supporting said first and second clamping systems, respectively;
 at least one compressive force generator arranged on a second side of the workpiece clamping axis opposite said first side and in parallel with the workpiece clamping axis for moving the support means relative to each other;
 each clamping system having two eccentric presses, each represented by two rotatable shafts supported orthogonally to the workpiece clamping axis, the two shafts eccentrically supporting a clamping bar arranged parallel to the clamping axis and moving to and fro on rotation of the shafts.

10. Flash butt welding facility according to claim 9, wherein the clamping bars are pivotable about an axis in parallel to the workpiece clamping axis and engage at the profile web underneath a profile head of the profiled workpiece.

11. Flash butt welding facility according to claim 9, including, for adjusting the ends of the profiled workpieces to be welded together, at least four fixedly mounted adjusting profiles arranged along the workpiece clamping axis, the eccentric presses being in each case interposed between two adjusting profiles, each adjusting profile having at least one angular stop, and said clamping presses engage at the profiled workpieces in such a way that the latter are pressed with edge adjustment into said angular stops.

12. Flash butt welding facility according to claim 9, including an elevating cylinder aligned perpendicularly to the workpiece clamping axis, said cylinder operating the pivotable clamping bars by means of pull rods.

13. Flash butt welding facility according to claim 9, in which the clamping system for clamping a profiled workpiece comprises two eccentric presses with respectively two eccentric shafts, and said respectively two eccentric shafts arranged on the same side of the clamping axis are driven by a joint press cylinder engaging with one end, at one eccentric shaft and, with the other end, at the other eccentric shaft.

14. Flash butt welding facility for welding together a first and a second profiled workpiece, comprising:
 a first and a second clamping system for retaining and positioning the first and second profiled workpieces aligned on a workpiece clamping axis, wherein the clamping systems are open to a first side perpendicular to the workpiece clamping axis for receiving the first and second workpieces, respectively;
 first and second support means for supporting said first and second clamping systems, respectively;
 at least one compressive force generator arranged on a second side of the workpiece clamping axis opposite said first side and in parallel with the workpiece clamping axis for moving the support means relative to each other;
 a flash trimming device with blades supported by a horizontal supporting plate pivotally held by parallel operating horizontal levers for swinging the blades inwards and outwards, said blades being supported in the swung-out position behind a plane defined by the front side of a contact electrode facing the welding site as well as outside of the contact electrodes.

15. Flash butt welding facility according to claim 14, wherein the blades, in the inwardly swung position, rest on the contact electrodes for being pushed over the weld seam site by means of a compressive force generator during the flash trimming step.

16. Flash butt welding facility according to claim 15, in which the supporting plate, in the inwardly swung position, is pivoted past dead center by an angle of approximately 30°, the friction forces during flash trimming leading to a torque pressing the blades onto the workpieces.

* * * * *